(12) United States Patent
Nishihara et al.

(10) Patent No.: US 6,417,271 B1
(45) Date of Patent: Jul. 9, 2002

(54) ELASTOMER COMPOSITION

(75) Inventors: Hajime Nishihara, Yokohama; Shinichi Shibayama, Kawasaki; Naohiko Sato, Yokohama, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/539,784

(22) Filed: Mar. 31, 2000

(51) Int. Cl.$^7$ .................. C08L 83/04; C08L 23/04; C08L 23/10
(52) U.S. Cl. .................. 525/105; 524/267; 524/268; 525/100; 525/106; 525/191; 526/160
(58) Field of Search .................. 525/100, 105, 525/237, 191, 106; 524/261, 267, 266, 268; 526/160

(56) References Cited

U.S. PATENT DOCUMENTS 5,708,084 A * 1/1998 Hauenstein et al.
5,902,854 A * 5/1999 Kelley et al.
6,048,942 A * 4/2000 Buehler et al.
6,087,431 A * 7/2000 Uchida et al.
6,153,680 A * 11/2000 Shah et al.

\* cited by examiner

Primary Examiner—Robert Dawson
Assistant Examiner—Marc S. Zimmer
(74) Attorney, Agent, or Firm—Birch, Stewart, Kolasch & Birch, LLP

(57) ABSTRACT

A vulcanized, olefinic elastomer composition comprising (A) 1 to 99 parts by weight of an ethylene-α-olefin copolymer prepared using a metallocene catalyst which copolymer comprises an ethylene unit and an α-olefin unit having 3 to 20 carbon atoms and (B) 1 to 99 parts by weight of a polypropylene resin, provided that the total amount of the components (A) and (B) is 100 parts by weight, wherein (C) a polyorganosiloxane having a dynamic viscosity at 25° C. of at least 5,000 centistokes is contained in a proportion of 0.01 to 20 parts by weight per 100 parts by weight of a total of the components (A) and (B).

13 Claims, 1 Drawing Sheet

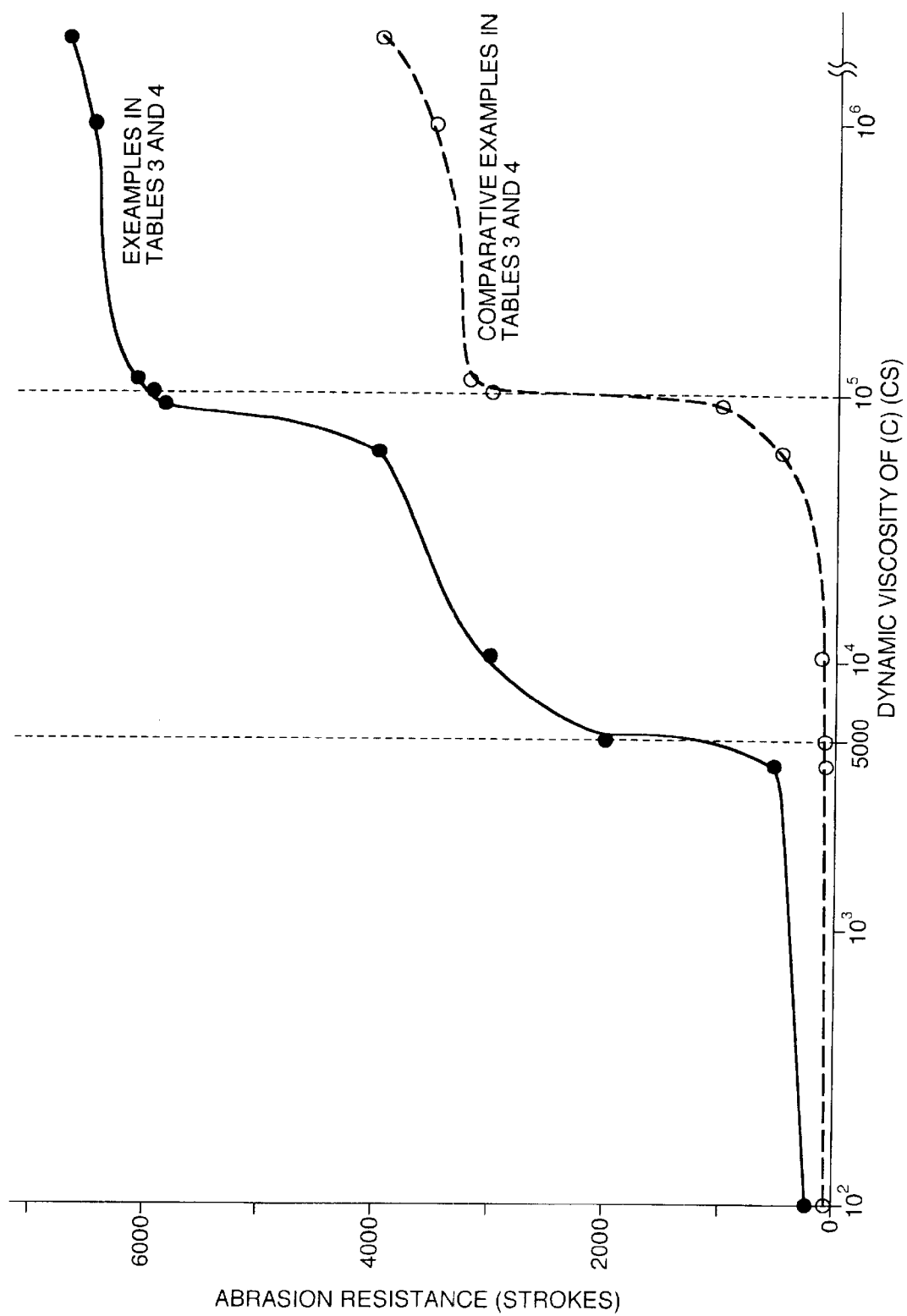

ELASTOMER COMPOSITION

BACKGROUND OF THE INVENTION (1) Field of the Invention

This invention relates to an olefinic elastomer composition. In particular, it relates to an olefinic elastomer composition which is excellent in mechanical characteristics, abrasion resistance, tackiness-free hand feeling, extrusion stability and quality stability.

(2) Description of the Related Art

For the purpose of improving the appearance and touch of automobile interior and exterior trim parts, domestic applicance parts, OA equipment goods, sporting goods, miscellaneous goods for daily use and the like and imparting thereto a design property, good feel to portions which are in direct contact with the hand, and a non-slip function or the like, there has heretofore very often been used a technique of using a flexible elastomer (rubber type) in exposed parts requiring a good appearance.

As this flexible elastomer, there have heretofore often been used flexible vinyl chloride resins and vulcanized rubbers in which an ethylene-propylene-diene rubber (referred to hereinafter as EPDM), a styrene-butadiene rubber or the like is used; however, for the economic reason of production costs and from the consideration for environmental problems and the like, substitution therefore of thermoplastic elastomers, representatives of which are styrenic thermoplastic elastomers, olefinic thermoplastic elastomers and the like, is now under extensive examination.

These thermoplastic elastomers are excellent in moldability for injection molding, extrusion molding, blow molding or the like and, in addition, excellent in flexibility and touch, and therefore, have been used in various fields.

In particular, in the case of the olefinic thermoplastic elastomers, those produced by subjecting a vulcanizable (cross-linkable), olefinic elastomer and polypropylene (referred to hereinafter as PP) to vulcanization reaction (cross-linking reaction) in the presence of a vulcanizing agent (cross-linking agent) while melt-mixing them in an extruder, namely the so-called dynamic vulcanization, have been extensively examined as substitutes for conventional materials used in automobile interior trim parts and the like, and have actually been adopted in many parts.

However, on the one hand, the conventional olefinic thermoplastic elastomers have a problem of tackiness upon contact with hands or damageability and a problem that the abrasion wear is large, and the like in parts which are directly contacted with the hand such as grip and the like and external parts which always contact with other portions such as pedals and the like. The replacement of the abovementioned flexible vinyl chloride resins with a substitute which is relatively excellent in these touch characteristics and scratch resistance and characteristics such as abrasion resistance and the like has been delayed under the existing circumstances.

On the other hand, for these problems, there have been proposed a thermoplastic elastomer composition composed of a dynamically vulcanized, olefinic thermoplastic elastomer and a polydimethylsiloxane having a dynamic viscosity of at least 100,000 centistokes (JP-A-11(1999)-35,750) and a thermoplastic elastomer composition composed of a styrenic thermoplastic elastomer, a dynamically vulcanized olefinic thermoplastic elastomer, a paraffin oil and a polydimethylsiloxane having a dynamic viscosity of at least 50,000 centistokes (JP-A-8(1996)-319,383), and the publications state that the tackiness and damageability are improved. In addition, a thermoplastic elastomer composition composed of a dynamically vulcanized, olefinic, thermoplastic elastomer having added thereto a polydimethylsiloxane having a dynamic viscosity of 50 to 5,000 centistokes (JP-A-5(1993)-1,183) is proposed and the publication states that the mold release characteristics are improved. However, it is silent on abrasion resistance, and requires a further improvement.

SUMMARY OF THE INVENTION

In view of such a situation, this invention aims at providing an olefinic elastomer composition having no problems as mentioned above.

The present inventors have diligently examined improvement of, particularly, the abrasion resistance of an olefinic elastomer composition, and as a result, have surprisingly found that by blending a specific polyorganosiloxane with a specific ethylene-α-olefin copolymer, the abrasion resistance is enhanced remarkably, and accomplished this invention. That is to say, this invention has been completed by finding that with an ethylene-α-olefin copolymer prepared using a non-metallocene catalyst, the abrasion resistance is improved only when a ultra-high-molecular-weight polyorganosiloxane is used; however, with the above copolymer obtained using a metallocene catalyst, excellent abrasion resistance is developed even when a polyorganosiloxane in a relatively low viscosity region is used.

That is, this invention is a partially or completely vulcanized, olefinic elastomer composition comprising (A) 1 to 99 parts by weight of an ethylene-α-olefin copolymer prepared using a metallocene catalyst which copolymer consists of ethylene and an α-olefin having 3 to 20 carbon atoms and (B) 1 to 99 parts by weight of a polypropylene resin, provided that the total amount of the components (A) and (B) is 100 parts by weight, wherein (C) a polyorganosiloxane having a dynamic viscosity at 25° C. of at least 5,000 centistokes is contained in a proportion of 0.01 to 20 parts by weight per 100 parts by weight of a total of the components (A) and (B), particularly the above vulcanized, olefinic elastomer composition in which the dynamic viscosity of the component (C) is at least 5,000 centistokes but less than 100,000 centistokes.

The vulcanized (cross-linked), olefinic elastomer composition of this invention has remarkably improved abrasion resistance and is excellent in hand feeling and scratch resistance. Moreover, as a result of the enhancement of the dispersibility of the polyorganosiloxane (C), the above composition is excellent in extrusion stability and quality stability. In addition, the vulcanized, olefinic, thermoplastic composition of this invention can be widely used in interior automotive trim materials, representatives of which are instrument panel cover, air bag cover, handle, shift knob lever, window molding, pedal pad and the like, and further in uses including domestic appliances, miscellaneous goods, daily necessaries, sporting goods, constructional materials, sheets, films and the like, and the commercial values thereof are very high.

BRIEF DESCRIPTION OF THE DRAWING

FIG. 1 is a view showing a relation between the dynamic viscosity of the component (C) and the abrasion resistance of the composition in the Examples and Comparative Examples in Tables 3 and 4. The axis of abscissa is the dynamic viscosity (CS) of the component (C) and the axis of coordinate indicates the number of rubbing strokes required until the leather grain on the surface of molded article disappears which number serves as an indication of abrasion resistance of the composition. Moreover, in the figure, • indicates the composition of the copolymer obtained using the metallocene catalyst of this invention (Examples) and o indicates the composition of the copolymer obtained using the non-metallocene catalyst (Comparative Examples).

DESCRIPTION OF PREFERRED EMBODIMENTS

It is important that the ethylene-α-olefin copolymer (A) is one produced using a metallocene catalyst. By using the metallocene catalyst, the crystallinity of the above copolymer increases, and consequently, the rebound resilience is enhanced. Usually, when a rigid material is contacted with a rubber, scar or scratch remains on the rubber. However, when the above copolymer having high rebound resilience is used, the scar is recovered and the damage becomes inconspicuous. And, with the above copolymer obtained using the metallocene catalyst, excellent abrasion resistance is developed by use of a polyorganosiloxane in a relative low viscosity region. On the other hand, the above copolymer produced using the non-metallocene catalyst (Ziegler catalyst), the abrasion resistance is improved only when an ultra-high-molecular-weight polyorganosiloxane is used.

Each of the components of this invention is explained in detail below.

(A) Ethylene-α-olefin Copolymer

The ethylene-α-olefin copolymer used as the component (A) in this invention comprises ethylene and an α-olefin as the essential components and, if necessary, a diene component. The ethylene-α-olefin copolymer includes, for example, an ethylene-α-olefin copolymer composed of ethylene and an α-olefin having 3 to 20 carbon atoms and an ethylene-α-olefin-diene copolymer composed of ethylene, an α-olefin having 3 to 20 carbon atoms and a diene component, a representative of which is dicyclopentadiene.

As the above α-olefin having 3 to 20 carbon atoms, there are mentioned, for example, propylene, butene-1, pentene-1, hexene-1, 4-methylpentene-1, heptene-1, octene-1, nonene-1, decene-1, undecene-1, dodecene-1 and the like. Of the above, preferable are hexene-1, 4-methylpentene-1 and octene-1, and of them, most preferable are hexene-1, 4-methylpentene-1 and octene-1. Octene-1 is excellent in the effect of imparting the flexibility of the polymer per se in a small amount, and particularly excellent in the balance between mechanical strength and flexibility of the copolymer obtained.

The ethylene-α-olefin copolymer which is suitably used in this invention is produced using a known metallocene catalyst.

In general, the metallocene catalyst consists of a cyclopentadienyl derivative of a metal of Group IV such as titanium, zirconium or the like and a cocatalyst and is not only highly active as a polymerization catalyst but also characterized in that as compared with the Ziegler catalyst, the molecular distribution of the polymer obtained is narrow and the distribution of the α-olefin having 3 to 20 carbon atoms which is the comonomer of the copolymer is uniform.

In this invention, the copolymerization ratio of the α-olefin in the component (A) is preferably 1 to 50% by weight, more preferably 10 to 40% by weight and most preferably 20 to 40% by weight. When the copolymerization ratio of the α-olefin exceeds 50% by weight, the deterioration of mechanical strength and heat resistance of the composition is remarkable, while when it is less than 1% by weight, the composition is high in hardness and lacking in flexibility as a rubber, so that these polymerization ratios are not desirable.

The density d of the component (A) of this invention is preferably in a range of 0.8 to 0.9 g/cm$^3$. By use of an ethylene-α-olefin having a density in this range, an elastomer composition can be obtained which has an excellent balance between mechanical strength and flexibility.

It is desirable that the component (A) of this invention has a long chain branch. The presence of the long chain branch enables the density to be made small relatively to the ratio of the copolymerized α-olefin (% by weight) without dropping the mechanical strength. The ethylene-α-olefin copolymer having a long chain branch is described in U.S. Pat. No. 5,278,272 and the like.

The melt flow rate of the component (A) of this invention is preferably in a range of 0.01 to 100 g/10 min (at 190° C. under a load of 2.16 kg), more preferably 0.1 to 10 g/10 min. When it exceeds 100 g/10 min, the cross-linkability is insufficient and when it is less than 0.01 g/10 min, the flow properties are deteriorated and the processability is deteriorated, so that these melt flow rates are not desirable.

The component (A) used in this invention may be used in admixture of several kinds. When several kinds are mixed, it becomes possible to enhance the processability.

(B) Polypropylene Resin

The polypropylene resin (B) in this invention includes isotactic homopolymer of propylene, isotactic copolymer resins of propylene with other α-olefins such as ethylene, butene-1, pentene-1, hexene-1 and the like (including block copolymer and random copolymer), and the like.

At least one kind of the component (B) selected from these resins is used at a composition ratio of 1 to 99 parts by weight per 100 parts by weight of a total of the components (A) and (B). The ratio is preferably 5 to 90 parts by weight, more preferably 15 to 80 parts by weight and most preferably 15 to 70 parts by weight, per 100 parts by weight of a total of the components (A) and (B). When the ratio is less than 1 part by weight, deterioration of the flow properties and processability of :the composition is caused and when it exceeds 99 parts by weight, the flexibility of the composition becomes insufficient. Neither of these ratios are desirable.

Furthermore, the melt flow rate of the component (B) used in this invention is preferably in a range of 0.1 to 100 g/min (at 230° C. under a load of 2.16 kg). When it exceeds 100 g/min, the heat resistance and mechanical strength of the thermoplastic elastomer are insufficient, and when it is less than 1 g/10 min, the flow properties are bad and the processability is deteriorated, so that these melt flow rates are not desirable.

(C) Polyorganosiloxane

In this invention, the type of the polyorganosiloxane (C) is not critical so long as it is in a liquid state, a resinous state, a viscous, starch syrup-like state or a rubber-like state, has a polymeric structure of linear, branched or cross-linked structure and has a dynamic viscosity (25° C.) of at least 5,000, centistokes (abbreviated hereinafter as CS) according to the definition of JIS K 2410. When the dynamic viscosity of the component (C) is at least 5,000 CS, an excellent effect is exerted on the enhancement of abrasion resistance and hand feeling.

As to the upper limit of the dynamic viscosity of the component (C), the actually measurable range is up to about several million CS; however, even when the polyorganosiloxane (C) in this range is used, it is possible to obtain a good composition meeting the object of this invention. However, from the viewpoint of dispersibility, a dynamic viscosity of less than 100,000 CS is preferable. When the dynamic viscosity is not less than 100,000 CS, the dispersibility of the component (C) tends to be lowered and the appearance is damaged in some cases. In addition, the quality stability during melt-extrusion is also deteriorated in some cases.

The dynamic viscosity (25° C.) of the polyorganosiloxane (C) used in this invention is not less than 5,000 CS, more preferably not less than 10,000 CS but less than 100,000 CS and most preferably not less than 50,000 CS but less than 100,000 CS.

The useful polyorganosiloxane (C) in this invention is generally a polymer comprising an alkyl, vinyl and/or aryl group-substituted siloxane unit, and the structure thereof is represented by the following formula and polydimethylsiloxanes represented by the formula in which $R_1$ to $R_4$ are all methyl groups are most preferable:

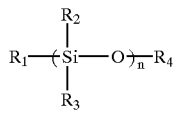

wherein $R_1$ to $R_4$ are hydrocarbon groups having 1 to 10 carbon atoms and may be the same as or different from one another; n is an average value of 1 or more and varies in the range of dynamic viscosity at 25° C. of not less than 5,000 CS.

The amount of the polyorganosiloxane (C) added in this invention is 0.01 to 20 parts by weight per 100 parts by weight of a total of the components (A) and (B) which are the constituents of the olefinic elastomer composition of this invention. When the amount of the component (C) added is less than 0.01 part by weight, the addition effect is not sufficiently exerted, and when it exceeds 20 parts by weight, the effect on abrasion reaches the uppermost limit and tack due to the component (C) per se results. Therefore, these amounts are not desirable. The particularly preferable addition amount range is 0.1 to 20 parts by weight per 100 parts by weight of a total of the components (A) and (B) and the more preferable range is 0.2 to 10 parts by weight.

Furthermore, for the purpose of imparting other functions such as mold release characteristics and the like, if necessary, a polyorganosiloxane having a dynamic viscosity of less than 5,000 CS may be used together with the above polyorganosiloxane (C).

It is preferable to incorporate into the olefinic elastomer composition of this invention a softening agent, if necessary, for imparting a flexibility and improving the processability.

The above softening agent is preferably a paraffinic process oil, a naphthenic process oil or the like. The amount of the above process oil compounded is not critical; however, in general, the softening agent is used in an amount of 5 to 300 parts by weight, preferably 10 to 150 parts by weight, per 100 parts by weight of a total of the components (A) and (B) which are the constituents of the olefinic elastomer composition of this invention. When the amount is less than 5 parts by weight, the addition effect of the process oil is not sufficiently exerted, and when it exceeds 300 parts by weight, the composition cannot hold the oil, the oil bleed to the surface of a molded article becomes noticeable, the appearance is impaired and the hand feeling is deteriorated, so that the above amounts are not desirable.

The olefinic elastomer composition provided by this invention has an excellent balance of all of the appearance performance characteristics, such as scratch resistance, abrasion resistance, feeling or the like, mechanical strength, flexibility and processability by combining the components (A), (B) and (C) explained hereinbefore with a process oil which is the abovementioned softening agent, and hence, can be preferably used as a molding material.

In addition, it is necessary to vulcanize the olefinic elastomer composition of this invention, whereby it becomes possible to enhance the abrasion resistance, mechanical strength, heat resistance and the like.

In this invention, the means for vulcanizing the composition is not critical; however, most recommendable is a procedure of vulcanizing the composition using a phenolic vulcanizing agent (crosslinking agent) or a radical initiator such as an organic peroxide or the like alone or in combination with a vulcanizing coagent.

Specific examples of the radical initiator which is preferably used in this case include peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy) cyclododecane, 1,1-bis (t-butylperoxy)cyclohexane, 2,2-bis (t-butylperoxy)octane, n-butyl-4,4-bis(t-butylperoxy) butane, n-butyl-4,4-bis(t-butylperoxy)valerate and the like; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy) diisopropylbenzene, 2,5-dimethyl-2,5-bis(t-butylperoxy) hexane, 2,5-dimethyl-2,5-bis(t-butylperoxy)hexyne-3 and the like; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, m-toluoyl peroxide and the like; peroxy esters such as t-butyl peroxyacetate, t-butyl peroxyisobutyrate, t-butyl peroxy-2-ethylhexanoate, t-butyl peroxylaurate, t-butyl peroxybenzoate, di-t-butyl peroxyisophthalate, 2,5-dimethyl-2,5-di(benzoylperoxy) hexane, t-butyl peroxymaleate, t-butyl peroxyisopropylcarbonate, cumyl peroxyoctate and the like; hydroperoxides such as t-butyl hydroperoxide, cumene hydroperoxide, diisopropylbenzene hydroperoxide, 2,5-dimethylhexane-2,5-dihydroperoxide, 1,1,3,3-tetramethylbutyl peroxide and the like.

Of these compounds, particularly preferably used are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)-hexyne-3.

These radical initiators are used in an amount of 0.02 to 3 parts by weight, preferably 0.05 to 1 part by weight, per 100 parts by weight of the component (A). When the amount is less than 0.02 part by weight, the cross-linking is insufficient. On the other hand, even if the initiator is added in an amount exceeding 3 parts by weight, physical properties such as mechanical strength and the like of the composition reaches the uppermost limit and hence the excess amount becomes insignificant.

Moreover, as the vulcanizing coagent (cross-linking coagent), preferably used are divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenylmaleimide, allyl methacrylate, N,N'-m-phenylene-bismaleimide, diallyl phthalate, tetraallyloxyethane, 1,2-polybutadiene and the like. These cross-linking coagents may be used alone or in combination of two or more.

These vulcanizing coagents are used in an amount of 0.1 to 5 parts by weight, preferably 0.5 to 2 parts by weight, per 100 parts by weight of the component (A). When the amount is less than 0.1 part by weight, the vulcanization reaction is not sufficient. Even if the vulcanizing coagent is added in an amount exceeding 5 parts by weight, physical properties such as mechanical strength and the like of the composition are not enhanced, and rather, such a result is brought about that the excess vulcanizing coagent remains in the composition, so that the above amounts are not desirable in view of quality.

Furthermore, the olefinic elastomer composition of this invention may be used in combination with other thermoplastic resins and thermoplastic elastomers in such an amount that the characteristics of the composition are not impaired.

Specifically, there are preferably used high density polyethylene; low density polyethylene; polybutene; polyisobutene; ethylene-vinyl ester copolymers such as ethylene-vinyl acetate copolymer and the like; ethylene-unsaturated carboxylic acid ester copolymers such as ethylene-ethyl acrylate copolymer and the like; ethylene-vinyl alcohol copolymer; block copolymers such as styrene-butadiene block copolymer and its hydrogenation product, styrene-isoprene block copolymer and its hydrogenation product and the like; etc.

Especially, the above-mentioned block copolymers have been commercialized and some examples thereof are TUFTEC and TUFPREN marketed by ASAHI CHEMICAL INDUSTRY CO., LTD.; SEPTON and HYBRAR marketed by KURARAY CO., LTD.; KRATON G and KRATON D marketed by SHELL CHEMICAL CORP.; and the like.

When a higher stability is required in the olefinic elastomer composition of this invention, there can be compounded, if necessary, at least one stability-improving agent selected from the group consisting of an ultraviolet absorber, a hindered amine type light stabilizer, an antioxidant, and a light screen such as titanium oxide or the like.

The amount of the above stability-improving agent added is not critical in this invention, though the amount is preferably 0.05 to 20 parts by weight, more preferably 0.1 to 10 parts by weight and most preferably 0.5 to 5 parts by weight, per 100 parts by weight of a total of the components (A) and (B).

Moreover, the olefinic elastomer composition of this invention can contain an inorganic filler in such an amount that the characteristics of the composition are not impaired. The inorganic filler used in this case includes, for example, calcium carbonate, magnesium carbonate, silica, carbon black, glass fiber, titanium oxide, clay, mica, talc, magnesium hydroxide, aluminum hydroxide and the like.

In addition, there are suitably used other additives, for example, organic and inorganic pigments, flame retardants, metal fibers, organic fibers, antiblocking agents, a representative of which is ethylene-bis-stearate, foaming agents, foaming nucleating agent, antistatic agents, antibacterial agents and the like.

For producing the olefinic elastomer composition of this invention, there can be adopted a general means which is used in the production of a usual thermoplastic composition or thermoplastic elastomer, such as a Banbury mixer, a kneader, a single screw extruder, a twin-screw extruder or the like. In order to achieve particularly efficiently the dynamic vulcanization, the twin-screw extruder is preferably used. The twin-screw extruder is more suitable for continuously producing the suitable olefinic elastomer composition of this invention by uniformly and finely dispersing the components (A) and (B), further adding the other components and subjecting them to vulcanizing reaction.

The olefinic elastomer composition of this invention can be produced through such a processing step as mentioned in the following example. That is to say, the components (A) and (B) are well mixed and then introduced into the hopper of an extruder. A vulcanization initiator and a vulcanizing coagent and/or the polyorganosiloxane (C) may be each fed to the extruder at the beginning together with the components (A) and (B) or in the middle of the extruder. Moreover, the polyorganosiloxane and/or the process oil used as the softening agent may be fed in the middle of the extruder or may be divided and fed both at the beginning and in the middle of the extruder. Moreover, a part of each of the components (A) and (B) may be fed in the middle of the extruder. When the components are heat-melted and kneaded in the extruder, the above component (A) causes vulcanizing reaction with the vulcanization initiator and the vulcanizing coagent, and by further feeding the process oil and the like to the mixture and melt-kneading them, vulcanization reaction and dispersion by kneading are allowed to proceed sufficiently, after which the reaction mixture is taken out of the extruder. At last, by pelletizing the mixture obtained, pellets of the suitable olefinic elastomer composition of this invention can be obtained.

In this invention, as the method of adding the polyorganosiloxane (C), there may be used, in addition to the above example, a method using a master batch previously prepared using any thermoplastic resin or elastomer and concentrating it to a higher concentration. Hereupon, "master batch" means a composition composed of previously mixed two or more components. The thermoplastic resin used is preferably a resin of the same family as the component (A) or (B) used in this invention. The components (A) or (B) and (C) may together be a master batch as a simple blend or be a graft of the component (A) or (B) with the component (C) having an organic group such as a vinyl group. Moreover, there can be used a master batch obtained by adsorption-impregnating (D), a powder which has an average particle diameter of 0.001 to 1,000 $\mu$m and does not melt at 250° C. or below with the component (C). In this case, a thermoplastic resin or elastomer can also be blended.

The above component (D) is a powder of, for example, a silicon-containing compound, a thermosetting resin, a metal, a metal-containing compound, a halogen-containing compound, a nitrogen-containing compound, a reinforcing agent, ceramic, a light-resisting agent, a coloring agent or the like, and of them, a silicon-containing compound such as silica or the like is preferred. The average particle diameter is 0.001 $\mu$m to 10 $\mu$m, preferably 0.01 $\mu$m to 10 $\mu$m, more preferably 0.1 $\mu$m to 5 $\mu$m, and most preferably 0.1 $\mu$m to 2 $\mu$m. As the component (D), a surface-treated powder is particularly preferable and is excellent in mechanical strength. As a surface treating agent, there are known, for example, organic acids and silane-coupling agents. Of the above organic acids, preferable are higher fatty acids such as 2-ethylhexanoic acid, lauric acid, myristic acid, palmitic acid, stearic acid, behenic acid, montanic acid and the like.

The above silicon-containing compound is silica which is amorphous silicon dioxide, a silicone resin, a silicate or the like, and silica is particularly preferable.

The degree of cross-linking of the vulcanized olefinic elastomer composition of this invention is desirably at least 30%. When it is less than 30%, the vulcanizing (cross-linking) is insufficient, and hence, heat resistance such as compressive set or the like, physical properties such as rebound resilience and the like are deteriorated, so that this degree of cross-linking is not desirable. The degree of cross-linking as a measure of vulcanization is determined by refluxing 0.5 g of the vulcanized olefinic elastomer composition in 200 ml of orthodichlorobenzene for 20 hours, filtering the resulting solution through a quantitative filter paper, quantifying the residue on the filter paper after vacuum drying and determining by calculation the degree as a ratio (%) of the weight of the residue to the weight of the component (A) in the composition.

The olefinic thermoplastic elastomer composition of this invention can be molded into various molded articles by any molding method. Specifically, any molding method such as injection molding, extrusion molding, compression molding, blow molding, two-color molding, insert molding, injection blow molding, calender molding, expansion molding or the like can be suitably applied to the olefinic thermoplastic elastomer composition.

This invention is explained in more detail below using Examples and Comparative Examples; however, this invention should not be construed to be limited thereto. Incidentally, in the Examples and Comparative Examples, the test methods used in the evaluation of various physical properties are as follows:

(1) Surface Hardness

Four 2-mm thick sheets were piled one on another and subjected to evaluation according to ASTM D2240, Type A under an atmosphere of 23° C.

(2) Tensile Strength at Break [MPa]

Evaluated under an atmosphere of 23° C. according to JIS K 6251.

(3) Tensile Elongation at Break [%]

Evaluated under an atmosphere of 23° C. according to JIS K 6251.

(4) Abrasion Resistance

Evaluated using a color fastness rubbing tester. The evaluation conditions were as follows:

| Temp. conditions | Under an atmosphere of 23° C. |
|---|---|
| Stroke | 120 mm |
| Frequency | 1 stroke/2 sec |
| Load | 1 kg |
| Abrading material | Cotton cloth 100%, cambric No. 3 (according to JIS L 0803) Folded in three and mounted. |
| Contact area | 1 cm$^2$ |

Evaluation was based on the number of rubbing strokes required until the leather grain on the surface of molded article disappeared.

(5) Hand Feeling (Organoleptic Test)

A test sample was actually touched with hand under an atmosphere of 23° C. to evaluate dry touch (tackiness-free feeling) and whether fingerprint was left on the surface of molded article or not.

⊚: The hand feeling is very good and dry touch, and no fingerprint was left.

○: No tackiness was felt though fingerprint was left on the surface of molded article.

×: Fingerprint was left and tackiness and slimy feeling were confirmed.

(6) Rebound Resilience

Evaluated under an atmosphere of 23° C. using a tripsometer according to BS903.

(7) Scratch Resistance

A wedge having a rectangular fore end of 10 mm in length and 1 mm in width and having a weight of 300 g was allowed to fall down from a height of 5 cm and the resulting damage on the sheet was evaluated visually based on the following criterion:

⊚: Very good

○: Good

Δ: Good, but damage was noticeable.

×: Damage was remarkable.

Moreover, the surface of the sheet was scanned with laser using apparatus for non-contact measurement of three-dimensional surface roughness (Laser-Stylus 3D Surface Measuring System manufactured by Mitsutoyo) to quantify the depth of damage on the sheet.

(8) Dispersibility of the Component (C)

The surface appearance of the sheet was evaluated visually based on the following criterion:

⊚: Very good

○: Good

Δ: Good, but aggregation of component (C) and unevenness were noticeable.

×: Aggregation and unevenness were remarkable.

(9) Extrusion Stability (Stability of Quality)

Using a melt extruder, the resin composition was continuously melt-extruded for 10 hours, the tensile strength at break (Tb) of the composition obtained every one hour was determined, and a continuous productivity (stability of quality) was evaluated from the percentage change (%) of Tb defined below:

Percentage change (%) of $Tb = 100 \times [(Tb)_1 - (Tb)_0]/(Tb)_0$.

wherein $(Tb)_0$ is the average value of tensile strength at break and $(Tb)_1$ is the maximum value of tensile strength at break.

Each of the components used in the Examples and Comparative Examples were as follows:

(A) Ethylene-α-olefin Copolymer

1) Ethylene-octene-1 Copolymer (EOM-1)

This copolymer was prepared by the method in described in JP-A-3(1991)-163,088 in which a metallocene catalyst was used. The composition ratio of ethylene/octene-1 in the copolymer was 72/28 by weight (referred to hereinafter as EOM-1).

2) Ethylene-octene-1 Copolymer (EOM-2)

This copolymer was prepared by a usual method in which a Ziegler catalyst was used. The composition ratio of ethylene/octene-1 in the copolymer was 72/28 by weight (referred to hereinafter as EOM-2).

3) Ethylene/propylene/dicyclopentadiene Copolymer (EPDM-1)

This copolymer was prepared described in JP-A-3(1991)-163,088 in which a metallocene catalyst was used. The composition ratio of ethylene/propylene/dicyclopentadiene in the copolymer was 72/24/4 by weight (the copolymer is hereinafter referred to as EPDM-1).

4) Ethylene/propylene/dicyclopentadiene Copolymer (EPDM-2)

This copolymer was prepared by a usual method in which a Ziegler catalyst was used. The composition ratio of ethylene/propylene/dicyclopentadiene in the copolymer was 72/24/4 by weight (the copolymer is hereinafter referred to as EPDM-2).

(B) Polypropylene (PP)

Isotactic polypropylene manufactured by Nippon Polychem Kabushiki Kaisha (melt flow rate under the conditions of 23° C. and a load of 1.26 kg: 30 g/10 min) (the isotactic polypropylene is hereinafter referred to as PP).

(C) Polyorganosiloxane

Polyorganosiloxanes having different dynamic viscosities were prepared according to a known technique, for example, the method disclosed in "Silicone Handbook", Chapter 17 Silicone Production Process [edited by Kunio Ito, published by Nikkan Kogyo Shinbunsha (1990)]. Also, a master batch composed of a graft of PP with a polyorganosiloxane containing a vinyl group was prepared.
(D) Softening Agent Paraffin oil (MO)

Diana Process Oil PW-90 manufactured by Idemitsu Kosan Kabushiki Kaisha (referred to hereinafter as MO).
(E) Radical Initiator 2,5-Dimethyl-2,5-bis(t-butylperoxy)hexane manufactured by NOF CORP. Trade name: Perhexa 25B (referred to hereinafter as POX).
(F) Cross-linking Agent Divinylbenzene manufactured by WAKO PURE CHEMICAL INDUSTRIES, LTD. (referred to hereinafter as DVB).
(G) Silica Commercially available silica ($SiO_2$) having an average particle diameter of 1 μm was used (referred to hereinafter as SI).

EXAMPLES 1 to 15

Comparative Examples 1 to 15

As an extruder, a twin-screw extruder (40 mm φ, L/D=47) having an oil-injecting hole in the center part of the barrel was used. As the screw, a twin screw having kneading parts before and after the oil-injecting hole was used.

The components shown in Table 1 were mixed at the composition ratio shown in Table 1 at once and thereafter all the components were introduced into the twin-screw extruder (cylinder temperature: 220° C.) and melt-extruded, provided that in the case of the composition in which (D) paraffin oil was used, the other components than the component (D) were mixed and thereafter introduced into the twin-screw extruder (cylinder temperature: 220° C.) and successively the necessary amount of the component (D) was injected by a pump into the extruder from the oil-injecting hole in the center part of the extruder and the resulting mixture was melt-extruded.

From the rubber type composition thus obtained, a 2-mm thick sheet was prepared by compression molding at 200° C., and each of the mechanical characteristics was evaluated. Further, a flat plate (MD: 15 cm, TD: 9 cm) having a leather grain on the right side and a mirror surface on the reverse side was injection-molded at a cylinder temperature of 200° C. by an injection molding machine and then cut to a width of 2.5 cm, after which the sample thus obtained was subjected to evaluation of abrasion resistance of the leather grain side by means of a color fastness rubbing tester in which the n numeral was set as 2. Moreover, the mirror surface on the reverse side was subjected to organoleptic test by hand feeling. The results obtained are shown in Tables 1 to 4 and FIG. 1.

TABLE 1

|  |  |  | Example 1 | Comparative Example 1 | Example 2 | Comparative Example 2 |
|---|---|---|---|---|---|---|
| Composition (parts by weight) | (A) | Amount | | | 50 | |
|  |  | Kind | EOM-1 | EOM-2 | EPDM-1 | EPDM-2 |
|  | (B) PP |  | | | 50 | |
|  | (C) MSI* | Amount | | | 2 | |
|  |  | Dynamic viscosity (CS) | | | 60,000 | |
|  | POX |  | | | 1.0 | |
|  | DVB |  | | | 2.0 | |
|  | MO |  | | | 50 | |
| Abrasion resistance (strokes) |  |  | 4000 | 500 | 3500 | 300 |
| Hand feeling |  |  | ◉ | X | ◉ | X |
| Extrusion stability: percentage change of Tb (%) |  |  | 5 | 20 | 7 | 23 |
| Dispersibility of (C) |  |  | ◉ | ◉ | ◉ | ◉ |
| Rebound resilience (%) |  |  | 65 | 45 | 60 | 41 |
| Scratch resistance |  |  | ◉ | X | ◉ | X |
| Average depth damage (μm) |  |  | 35 | 145 | 41 | 173 |

*: Dimethylsilicone

TABLE 2

|  | Composition (parts by weight) |  | Example |  |  |  |  | Comparative Example |
|---|---|---|---|---|---|---|---|---|
|  |  |  | 3 | 4 | 5 | 6 | 7 | 3 |
| Composition (parts by weight) | (A) | Amount | | | | 65 | | |
|  |  | Kind | | | | EOM-1 | | |
|  | (B) PP |  | | | | 35 | | |
|  | (C) MSI* | Amount | 3 | | 1 | | 0.01 | 0.001 |
|  |  | Dynamic viscosity (CS) | | | | 50,000 | | |

TABLE 2-continued

| Composition (parts by weight) | Example 3 | Example 4 | Example 5 | Example 6 | Example 7 | Comparative Example 3 |
|---|---|---|---|---|---|---|
| POX | | | | | 0.5 | |
| DVB | 0 | | | | 1.0 | |
| MO | 0 | 0 | | | 40 | |
| Tensile strength at break (MPa) | 9 | 10 | 7 | 8 | 9 | 9 |
| Tensile elongation at break (%) | 420 | 420 | 430 | 440 | 450 | 440 |
| Abrasion resistance (strokes) | 4,000 | 5,000 | 5,500 | 5,000 | 4,500 | 1,000 |
| Hand feeling | ○ | ◎ | ◎ | ◎ | ◎ | X |
| Extrusion stability: percentage change of Tb (%) | 10 | 8 | 6 | 5 | 4 | 15 |
| Dispersibility of (C) | ○ | ◎ | ◎ | ◎ | ◎ | Δ |

*: Dimethylsilicone

TABLE 3

| Composition (parts by weight) | | | Comparative Example 4 | Comparative Example 5 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|---|
| Composition (parts by weight) | (A) | Amount | | | | | | | 40 | | | | | |
| | | Kind | | | | | | | EOM-1 | | | | | |
| | (B) PP | | | | | | | | 60 | | | | | |
| | (C) MSI** | Amount | | | | | | | 2 | | | | | 1 |
| | | Dynamic viscosity (CS) | 100 | 4,000 | 5,000 | 10,000 | 60,000 | 90,000 | 100,000 | 110,000 | 1,000,000 | Gum# | | Gum# |
| | MPSI*** | Amount | | | | | | | | | | | 2 | 1 |
| | | Dynamic viscosity (CS) | | | | | | | | | | | 60,000 | 100,000 |
| | POX | | | | | | | | | 1.5 | | | | |
| | DVB | | | | | | | | | 3.0 | | | | |
| | MO | | | | | | | | | | | | | |
| Abrasion resistance (strokes) | | | 200 | 500 | 2,000 | 3,000 | 4,000 | 5,900 | 6,000 | 6,100 | 6,500 | 6,700 | 3,500 | 5,000 |
| Extrusion stability: percentage change of Tb (%) | | | 5 | 5 | 5 | 6 | 7 | 10 | 30 | 40 | 60 | 70 | 8 | 10 |
| Dispersibility of (C) | | | ◎ | ◎ | ◎ | ◎ | ◎ | ◎ | ○ | ○ | Δ | X | ◎ | ◎ |

Note
: Gum (Unmeasurable because of high viscosity)
*: Shows more preferable example
**: Dimethylsilicone
***: Methylphenylsilicone

TABLE 4

| Composition (parts by weight) | | | Comparative Example 6 | Comparative Example 7 | Comparative Example 8 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|---|---|---|
| Composition (parts by weight) | (A) | Amount | | | | | | | 40 | | | |
| | | Kind | | | | | | | EOM-2 | | | |
| | (B) PP | | | | | | | | 60 | | | |
| | (C) MSI* | Amount | | | | | | | 2 | | | |
| | | Dynamic viscosity (CS) | 100 | 4,000 | 5,000 | 10,000 | 60,000 | 90,000 | 100,000 | 110,000 | 1,000,000 | Gum# |
| | POX | | | | | | | | | 1.5 | | |
| | DVB | | | | | | | | | 3.0 | | |

TABLE 4-continued

| Composition | Comparative Example | | | | | | | | | |
|---|---|---|---|---|---|---|---|---|---|---|
| (parts by weight) | 6 | 7 | 8 | 9 | 10 | 11 | 12 | 13 | 14 | 15 |
| MO | | | | | | | | | | |
| Abrasion resistance (strokes) | 30 | 50 | 50 | 100 | 500 | 1,000 | 3,000 | 3,200 | 3,500 | 4,000 |
| Extrusion stability : percentage change of Tb (%) | 15 | 15 | 16 | 18 | 20 | 22 | 60 | 65 | 70 | 90 |
| Dispersibility of (C) | ⊚ | ⊚ | ⊚ | ⊚ | ⊚ | ⊚ | ○ | ○ | Δ | X |

Note
: Gum (Unmeasurable because of high viscosity)
*: Dimethylsilicone

According to Tables 1 to 4 and FIG. 1, the ethylene-α-olefin copolymer rubber type composition of this invention prepared using a metallocene catalyst exhibits a rapid enhancement of abrasion resistance at a relatively low dynamic viscosity of 5,000 CS. On the other hand, in the case of the above-mentioned copolymer prepared using a non-metallocene catalyst, the abrasion resistance is improved only when an ultra-high-molecular-weight polyorganosiloxane having a dynamic viscosity of at least 100,000 CS is used; however, it is seen that the level of the enhancement is low as compared with the case of metallocene catalyst. In addition, it is understood that the composition of this invention has excellent hand feeling and quality stability while holds its mechanical characteristics.

production process was changed to the following one, and subjected to evaluation, and the results obtained are shown in Table 5:

Production Process

X: The component (C) was adsorbed on the component (D) at 23° C. to prepare a master batch (MB) (the first step) and thereafter, in the second step extrusion, the MB was added to prepare the final composition.

Y: Without preparing the master batch, all the components were blended and melt-extruded to prepare a composition.

Z: The component (C) was melt-mixed or melt-grafted with the component (D) to prepare a master batch (MB) (the first step) and thereafter, in the second step extrusion, the MB was added to prepare the final composition.

TABLE 5

| Composition | | | Example | | | | | |
|---|---|---|---|---|---|---|---|---|
| (parts by weight) | | | 18 | 19 | 20 | 21 | 22 | 23 |
| First step (master batch) | (A) EOM-1 | | | 10 | | | | |
| | (C) | Amount (MSI*) | 50 | 50 | | | 50 | 50 |
| | | Dynamic viscosity (%) | 80,000 | 80,000 | | | 80,000 | 80,000 |
| | (D) | Amount (SI) | 50 | 40 | | | | |
| | | Average particle diameter (μm) | 1.0 | 1.0 | | | | |
| | | Amount (PP) | | | | | 50 | 50 |
| | | Grafting of PP with (C) | | | | | No | Yes |
| Second step | | Amount (MSI*) | | | 2 | 2 | | |
| | | Dynamic viscosity (%) | | | 80,000 | 80,000 | | |
| | | Amount (SI) | | | | 2 | | |
| | | Average particle diameter (μm) | | | | 1.0 | | |
| | (A) EOM-1 | | | | 50 | | | |
| | (B) PP | | | | 50 | | | |
| | POX/DVB | | | | 0.5/1.0 | | | |
| | MB prepared in first step | | 4 | 4 | 0 | 0 | 4 | 4 |
| | Production process | | X | X | Y | Y | Z | Z |
| | Abrasion resistance (strokes) | | 7,500 | 8,000 | 5,500 | 5,000 | 8,000 | 9,000 |
| | Hand feeling | | ⊚ | ⊚ | ⊚ | ⊚ | ⊚ | ⊚ |
| | Extrusion stability : percentage change of Tb (%) | | 2 | 1 | 8 | 9 | 2 | 1 |

*: Dimethylsilicone

EXAMPLES 16 to 23

A composition was prepared in the same manner as in Example 1, except that in the composition in Table 5, the According to Table 5, the use of a powder having an average particle diameter of 0.001 to 1,000 μm which does not melt at 250° C. or below enables the production of a high concentration master batch because the component (C) is absorbed or adsorbed at a high concentration, and consequently, not only is excellent abrasion resistance developed, but also has enhanced extrusion stability enhanced, so that a stable quality is maintained.

What is claimed is:

1. A vulcanized, olefinic elastomer composition comprising (A) 1 to 99 parts by weight of an ethylene-α-olefin copolymer prepared using a metallocene catalyst which copolymer comprises an ethylene unit and an α-olefin unit having 3 to 20 carbon atoms and (B) 1 to 99 parts by weight of a polypropylene resin, provided that the total amount of the components (A) and (B) is 100 parts by weight, wherein (C) a polyorganosiloxane having a dynamic viscosity at 25° C. of at least 5,000 centistokes is contained in a proportion of 0.01 to 20 parts by weight per 100 parts by weight of a total of the components (A) and (B).

2. The vulcanized, olefinic elastomer composition according to claim 1, wherein the component (C) has a dynamic viscosity at 25° C. of at least 50,000 centistokes.

3. The vulcanized, olefinic elastomer composition according to claim 1 or 2, wherein the component (C) is in the form of a master batch in which the component (C) is contained in (D) a silica powder.

4. The vulcanized, olefinic elastomer composition according to claim 1, wherein the copolymerization ratio of the α-olefin in the component (A) is 1 to 50% by weight.

5. The vulcanized, olefinic elastomer composition according to claim 4, wherein the copolymerization ratio of the α-olefin in the component (A) is 20 to 40% by weight.

6. The vulcanized, olefinic elastomer composition according to claim 1, wherein the density d of the component (A) is in a range of 0.8 to 0.9 g/cm$^3$.

7. The vulcanized, olefinic elastomer composition according to claim 1, wherein the propylene resin (B) is an isotactic homopolymer of propylene or an isotactic copolymer of propylene with at least one α-olefin selected from the group consisting of ethylene, butene-1, pentene-1, and hexene-1.

8. The vulcanized, olefinic elastomer composition according to claim 1, wherein (B) is in a concentration of 5 to 90 parts by weight per 100 parts by weight of a total of (A) and (B).

9. The vulcanized, olefinic elastomer composition according to claim 8, wherein (B) is in a concentration of 15 to 70 parts by weight per 100 parts by weight of (A) and (B).

10. The vulcanized, olefinic elastomer composition according to claim 1, wherein the melt flow rate of (B) is in a range of 0.1 to 100 g/min.

11. The vulcanized, olefinic elastomer composition according to claim 1, wherein polyorganosiloxane (C) is represented by the following formula

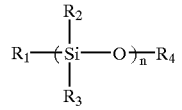

wherein $R_1$ to $R_4$ are hydrocarbon groups having 1 to 10 carbon atoms and may be the same as or different from one another, and n is an average value of 1 or more.

12. The vulcanized, olefinic elastomer composition according to claim 1, further comprising a radical initiator which is at least one selected from the group consisting of peroxyketals, dialkyl peroxides, diacyl peroxides, peroxy esters and hydroperoxides.

13. The vulcanized, olefinic elastomer composition according to claim 12, wherein the radical initiator is at least one selected from the group consisting of 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)-hexyne-3.

* * * * *